(12) United States Patent
Ette et al.

(10) Patent No.: US 9,637,088 B2
(45) Date of Patent: May 2, 2017

(54) VEHICLE ACCESS SYSTEM

(71) Applicant: Volkswagen Aktiengesellschaft, Wolfsburg (DE)

(72) Inventors: Bernd Ette, Wolfsburg (DE); Rico Petrick, Dresden (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/872,839

(22) Filed: Oct. 1, 2015

(65) Prior Publication Data

US 2016/0096509 A1 Apr. 7, 2016

(30) Foreign Application Priority Data

Oct. 2, 2014 (DE) .................. 10 2014 220 042

(51) Int. Cl.
G06K 9/00 (2006.01)
B60R 25/30 (2013.01)
B60R 25/01 (2013.01)
B60R 25/20 (2013.01)
G06F 3/01 (2006.01)
H04N 5/33 (2006.01)
H04N 7/18 (2006.01)

(52) U.S. Cl.
CPC ........... B60R 25/305 (2013.01); B60R 25/01 (2013.01); B60R 25/2045 (2013.01); B60R 25/2054 (2013.01); G06F 3/017 (2013.01); G06K 9/00335 (2013.01); G06K 9/00362 (2013.01); H04N 5/33 (2013.01); H04N 7/183 (2013.01)

(58) Field of Classification Search
CPC ......... B60R 25/30; B60R 25/01; B60R 25/20; H04N 5/33; H04N 7/18; G06F 3/01; G06K 9/00
USPC ........................................... 382/103
See application file for complete search history.

(56) References Cited

U.S. PATENT DOCUMENTS

| | | | |
|---|---|---|---|
| 8,508,608 B2 * | 8/2013 | Bub ...................... | H04N 1/195 348/218.1 |
| 8,670,899 B2 | 3/2014 | Fuchs et al. | |
| 2003/0048202 A1 * | 3/2003 | Francois ............ | G08B 13/1965 340/945 |
| 2005/0224001 A1 * | 10/2005 | Golden .................. | A01K 29/00 119/51.02 |

(Continued)

FOREIGN PATENT DOCUMENTS

CN 102647558 A * 8/2012
DE 10 2009 040 395 A1 4/2011

(Continued)

*Primary Examiner* — Gregory F Cunningham
(74) *Attorney, Agent, or Firm* — Muncy, Geissler, Olds & Lowe, P.C.

(57) ABSTRACT

A method for an access system for a vehicle includes the steps of recording a first optical information in a specific area surrounding the vehicle and detecting an object approaching the vehicle as a function of the recorded first optical information. As a function of detecting the approaching object, a second optical information in the surrounding area is recorded, and gesture information of the object is identified as a function of the second optical information. A locking device or door opening device of the access system is triggered as a function of gesture information.

13 Claims, 4 Drawing Sheets

(56) References Cited

U.S. PATENT DOCUMENTS

| | | | | |
|---|---|---|---|---|
| 2008/0170776 A1* | 7/2008 | Albertson | ............... | G06F 21/35 382/154 |
| 2012/0105630 A1* | 5/2012 | Cao | ............ | H04N 7/183 348/143 |
| 2012/0188200 A1* | 7/2012 | Roziere | ............. | G06F 3/044 345/174 |
| 2014/0232905 A1* | 8/2014 | Jung | ............. | H04N 5/265 348/239 |
| 2014/0245798 A1* | 9/2014 | Beckman | ............. | E05B 19/00 70/14 |
| 2015/0069118 A1* | 3/2015 | Roys | ............. | G09F 3/0297 235/380 |
| 2015/0120151 A1* | 4/2015 | Akay | ............. | B60R 25/24 701/49 |
| 2015/0261304 A1* | 9/2015 | Kamisawa | ............. | G07C 9/00174 340/5.28 |
| 2015/0284984 A1* | 10/2015 | Kanter | ............. | E05F 15/76 49/31 |
| 2016/0103499 A1* | 4/2016 | Yamamoto | ............. | G06F 3/017 345/156 |

FOREIGN PATENT DOCUMENTS

| | | |
|---|---|---|
| DE | 10 2010 011 767 A1 | 9/2011 |
| DE | 10 2012 017 393 A1 | 3/2014 |
| DE | 10 2012 222 175 A1 | 6/2014 |
| FR | 2 920 175 B1 | 2/2009 |

\* cited by examiner

VEHICLE ACCESS SYSTEM

This nonprovisional application claims priority under 35 U.S.C. §119(a) to German Patent Application No. 10 2014 220 042.3, which was filed in Germany on Oct. 2, 2014, and which is herein incorporated by reference.

BACKGROUND OF THE INVENTION

Field of the Invention

The present invention relates to a method for a vehicle access system as well as a corresponding vehicle access system. The present invention also relates to a vehicle access system in which a gesture carried out by the vehicle user is detected and used to operate a vehicle locking mechanism or a vehicle door opening mechanism.

Description of the Background Art

In vehicles such as passenger vehicles or commercial vehicles, sensors can be used for the opening and closing of closing devices, e.g. doors and hatches of the vehicle. The sensors can interpret movements or gestures of objects, for example, of the hands or feet of a user.

In this context, DE 10 2009 040 395 A1 discloses a method for operating a vehicle door, wherein an authentication process with a mobile identification device is performed via an onboard send/receive device. Furthermore, a movement pattern of an object in the vicinity of the vehicle is recorded with an onboard motion detection unit. The door is then unlocked and/or opened when a predefined movement pattern of the object is detected, and a successful authentication of the mobile identification device has been performed.

From DE 10 2012 017 393 A1, a method for automatic activation of a vehicle closing device is also known. With this method, an object entering into a first area surrounding the vehicle and a departure of the object from the first area surrounding the vehicle are detected. Furthermore, the method recognizes if the object remains at a standstill inside the first surrounding area, and the presence of an identification device in a second area surrounding the vehicle is selectively verified. The closing device is selectively activated as a function of the detected entrance and/or departure and/or standstill of the object.

In order for non-contact sensors to detect gestures or gesticulation, sensor signals are analyzed. The goal here is to aim for a recognition accuracy of >90% and a rejection rate of incorrect gestures of close to 100%. To achieve these rates, a continuous assessment of the gestures can be performed. Also, appropriate algorithms should be performed at high speeds. The processing of the sensor signals furthermore requires an adjustment to the ambient conditions. The continuous assessment requires a continuously large computing demand which can cause substantial power consumption. High power consumption, however, should be avoided in parked vehicles, particularly in electric vehicles.

In this context, DE 10 2010 011 767 A1 discloses a method for the sensory detection of a user event via a sensor arrangement. In the process, a first rough analysis of sensor readings is performed whenever an operator control event takes place. Furthermore, a predefined quantity of the most recent sensor readings of at least one sensor element is cached in a buffer memory, and a detailed analysis of the cached sensor readings and of any subsequent sensor readings is triggered.

There is generally a need to keep the power consumption for the automatic activation of a vehicle locking system or of a vehicle door opening system as low as possible.

SUMMARY OF THE INVENTION

It is therefore an object of the present invention to provide a method for a vehicle access system and a vehicle access system.

According to an exemplary embodiment, a method for a vehicle access system is provided. In this method, a first optical information in a certain area surrounding the vehicle is recorded. As a function of the recorded first optical information, an object, for example a user or a body part of a user, approaching the vehicle is identified. As a function of this identification, for example, when the approaching object has been detected, a second optical information in the surrounding area is recorded and, as a function of the second optical information, gesture information of the object is identified. A locking mechanism or a door opening mechanism of the access system is triggered as a function of gesture information. Optical proximity detection can be performed with very low power usage. Generally, a few microamperes are sufficient. Only when the first optical information has detected an approach to the vehicle is the second optical information recorded for the identification of gesture information. This can be done with the same optical sensor with which the first optical information was recorded so that outlay for multiple sensors can be spared. As the second optical information is generally more comprehensive than the first optical information since it is used to detect gesture information from the latter, recording the second optical information can require more electrical energy than recording the first optical information. However, since the second optical information is not recorded unless an object was detected from the first optical information, the increased need for energy rarely exists, and since the identification of gesture information is also only performed when the object approaching the vehicle has been detected, power consumption can also be decreased. Also, in contrast to, for example, acoustic collection of information, for example with ultrasonic sensors, optical collection of information can generally be performed with relatively low power consumption. The optical information generally offers more extensive and more detailed information than, for example, acoustic information, so that the identification of gesture information can be performed faster and with less calculation and power input.

According to an embodiment, the object movement in the area surrounding the vehicle is detected as the object approaches the vehicle, and any object remaining in the surrounding area is also identified. For example, an object approaching the vehicle can be detected, which then triggers the recording and analysis of the second optical information when the object moves into the surrounding area and remains there, i.e. remains basically motionless for at least a certain period of time. This way, the triggering of recording the second optical information and the identification of gesture information by passersby who pass through the area surrounding the vehicle can be avoided. The period of time in which the object must remain in the surrounding area before the second optical information is recorded and gesture information is identified can, for example, be a few tenths of a second up to, for example, one full second.

In an embodiment, the recording of the second optical information is terminated when the object remains in the surrounding area for longer than a predefined period of time.

This predefined period of time can, for example, last two or more seconds. This way, the identification of gesture information over a longer period of time can be prevented when, for example, another vehicle is parked next to the vehicle and was detected by the first optical information as the object in the surrounding area. The two measures described above can thus allow the identification of gesture information to be active only for a short period of time, thereby saving a significant amount of electrical energy.

In an embodiment, the method also comprises activation of a transponder radio system of the access system as a function of detecting the approaching object. Transponder radio systems are often used to operate so-called keyless entry systems. These require a relatively large amount of electrical energy in order to activate and scan a transponder. The transponder is carried by a vehicle user and scanned using transmitting antennas. By only activating the transponder radio system when an object approaching the vehicle has been detected, a significant portion of the energy for the transponder radio system can be saved.

As mentioned at the beginning, the object whose approach and gesture information is being detected is typically a human user of the vehicle, and gesture information can therefore particularly be identified as a function of a user's body part motion pattern, for example as a function of a user's arm or leg movement. According to one embodiment, a group of motion patterns is provided which, for example, include a movement of the body part in the direction of a vehicle's door handle, a movement of the body part in the slide-open direction of a sliding door of a vehicle, a movement of a body part in the slide-closed direction of a sliding door of a vehicle, as well as a back and forth movement of the body part. The back and forth movement of the body part is identified, for example, in that the body part moves into a particular sub-area of the surrounding area (movement towards) and subsequently leaves the particular sub-area of the surrounding area (movement away from). The movements described above are fairly easily identified as a function of the second optical information. Moreover, these are movements which a vehicle user normally performs intuitively in order to initiate certain actions. The movement of the body part in the direction of the door handle, for example, can be used to unlock the respective vehicle door or all vehicle doors, and a movement of the body part in the slide-open direction or the slide-closed direction of the vehicle sliding door can be used to trigger a door opening or door closing mechanism of the sliding door to open or close the sliding door. The back and forth movement of the body part, particularly, for example, of a foot, can be used in the area of a hatchback or a trunk lid in order to cause an automatic opening of the trunk lid or the hatchback. This allows the user to easily place a load which he/she is carrying into the vehicle with both hands.

In an embodiment, the gestures or a plurality of gestures described above can be provided, and for each gesture of this plurality of gestures, probability information can be identified as a function of the second optical information. The access system is triggered as a function of the probability information. This method allows for simple, fast and reliable identification of the intended gesture.

Additionally, the current status of the access system or of the vehicle can be identified and a sub-quantity of the predefined number of gestures as a function of the current status can be provided. This way, gestures that are not meaningful for the current vehicle status can be excluded from the analysis of the second optical information for identifying gesture information. If, for example, the vehicle sliding door is open, the identification of probability information for the slide-open direction can be omitted. This way, a portion of the computing power for gesture recognition can be saved, and gesture recognition can be processed faster and at a higher level of energy efficiency.

In an embodiment, the surrounding area can be illuminated with infrared light. The first optical information, and alternatively or additionally, the second optical information, is recorded in an infrared light sub-area. With the illumination and detection in the infrared light sub-area, the identification of approach and gesture can also be reliably performed under varying ambient light conditions. The illumination of the surrounding area can be done with infrared light impulses. This way, energy consumption for the illumination can be decreased. The detection of the first optical information or the second optical information is in this case only performed if the surrounding area is illuminated with an infrared light impulse. The optical information can, for example, be recorded only five to ten times per second in accordance with the appropriate, pulsed illumination. Such a detection rate is generally sufficient to identify an approach or a gesture. The infrared light impulses may last only a few milliseconds, preferably even less than one millisecond.

In an embodiment, the first optical information can be recorded with a first resolution and the second optical information is recorded with a second resolution. The second resolution is higher than the first resolution. The first optical information and the second optical information can, for example, be recorded with an arrangement of optical receivers. The arrangement of optical receivers can comprise, for example, several discrete optical receiving elements or several optical receiving elements integrated on a chip, for example a so-called CCD Chip (charge-coupled device). For recording the first optical information, for example, only a subset of the optical receiving elements can be triggered, whereas a larger subset of the elements, or all optical receiving elements, are triggered and read out when recording the second optical information. This way, electrical energy can be saved when recording the first optical information, and the processing for identifying the approaching object can be simplified.

According to an embodiment, an access system for a vehicle is also provided. The access system comprises an optical sensing mechanism for recording optical information in a specified area surrounding the vehicle. The access system further comprises a processing apparatus which is coupled with the optical sensing mechanism. The processing apparatus is capable of recording a first optical information via a sensing mechanism, and can identify an object approaching the vehicle as a function of the first optical information. The processing apparatus is furthermore capable of recording a second optical information in the area surrounding the sensing mechanism, as a function of the identification of the approaching object. It can identify the object's gesture information as a function of the second optical information. The access system can also comprise a locking mechanism or a door opening mechanism that are triggered as a function of gesture information. With the locking mechanism, for example, a door lock or vehicle hatch can be locked or unlocked, and with the door unlocking mechanism, for example, a door, particularly a vehicle sliding door or a vehicle hatch, can be automatically opened or closed. The access system is therefore suitable for performing the method described above, or one of its embodiments, and thus also provides the advantages described above.

Also, a vehicle with the access system described above is provided pursuant to the present invention. By using the access system described above, power consumption of a vehicle can be decreased, especially when parked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
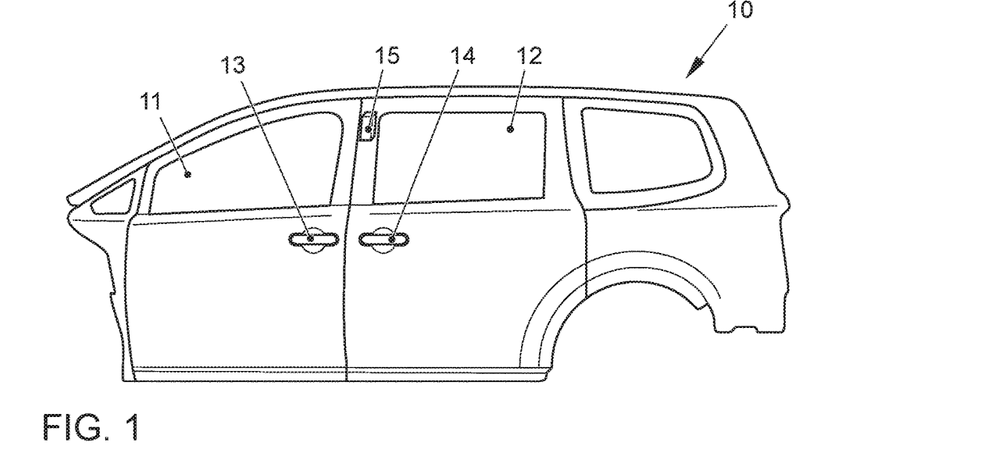
FIG. 1 shows a schematic, partial view of a vehicle according to an embodiment of the present invention.
Figure 2:
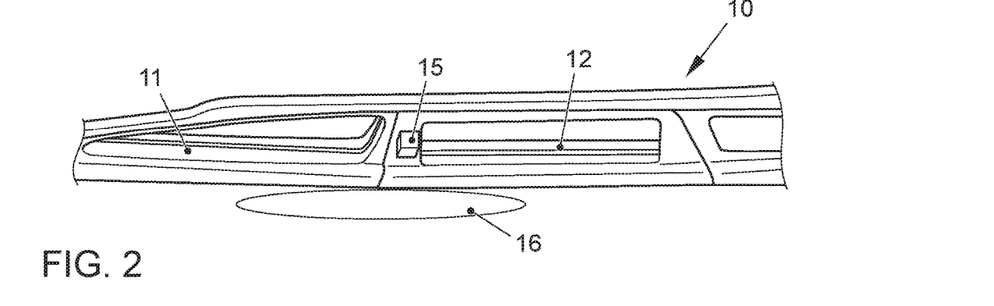
FIG. 2 shows a partial view of the vehicle from FIG. 1 above.
Figure 3:
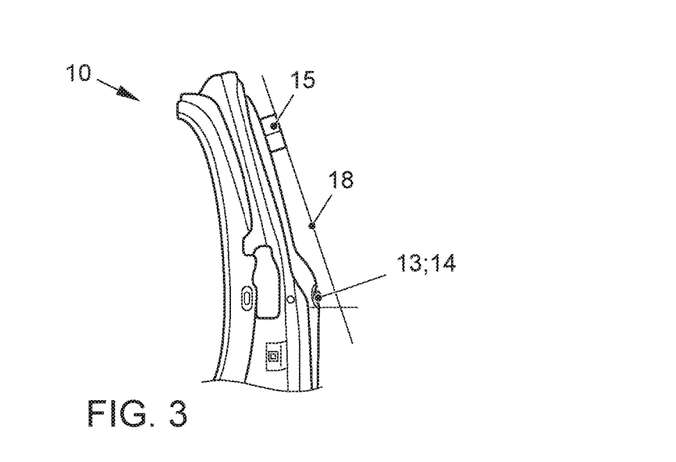
FIG. 3 shows a partial view of a vehicle from FIG. 1 as a cross-sectional view.

FIG. 1 shows a partial view of the left side of a vehicle 10. The vehicle 10 has a left front door 11 and a left rear door 12. The left rear door 12 is designed as a sliding door. For opening the doors, the front door 11 has a door handle 13 and the rear door 12 has a door handle 14. An optically operating access system 15 is arranged at a B-pillar of the vehicle 10 located between the front door 11 and the rear door 12. The access system 15 can, as described below with reference to FIG. 5, have an optical sensing mechanism for recording optical information in a specified area surrounding the vehicle 10, and a processing apparatus. The surrounding area, for example, comprises an area in front of the door handles 13, 14. FIG. 2 shows a portion of the vehicle 10 viewed from above which is shown in FIG. 1. FIG. 2 further shows a surrounding area 16 in which the optical sensing mechanism of the access system 15 can record the optical information. To further illustrate, FIG. 3 shows a cross-sectional view of a vehicle 10, viewing the vehicle 10 from the front. The access system 15 is installed above the door handles 13, 14 at the B-pillar of the vehicle 10 in such a way, that an optical axis 18 of the optical sensing mechanism runs along the outside of the vehicle 10, at the door handles 13, 14.

Figure 4:
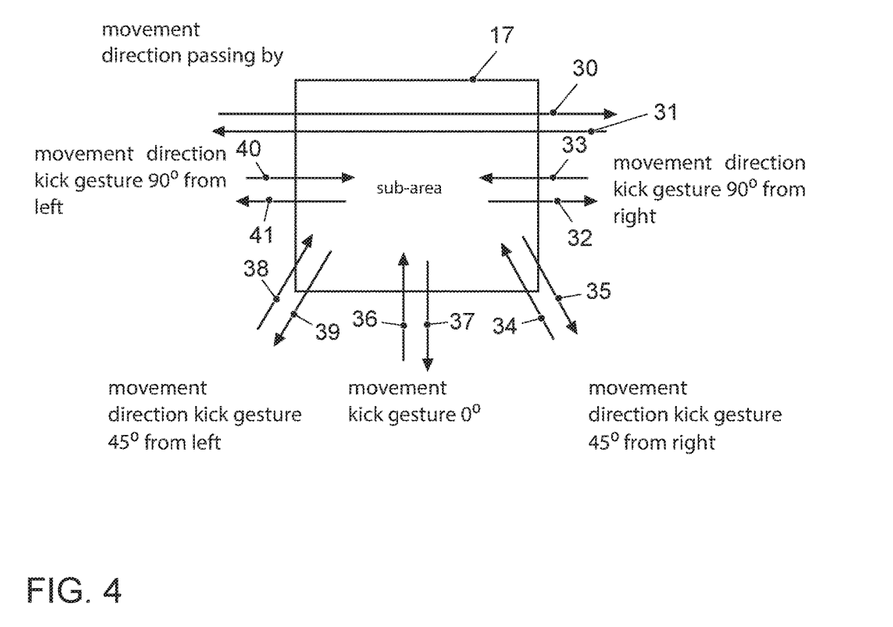
FIG. 4 shows a schematic view of directions of movement which are recorded in a partial sub-area of an access system's coverage area according to an embodiment of the present invention.

The access system 15, particularly the optical sensing mechanism, is tasked with detecting the presence of individuals as well as their gestures that operate the door handles or the sliding door. At the same time, the access system 15 is capable of detecting an individual approaching the vehicle and can also detect various gestures as well as the same individual passing by the vehicle. The access system 15 can detect movements occurring especially inside the coverage area 16 that relate to the sub-area 17 shown in FIG. 4. Sub-area 17 is located within the surrounding area 16 and may include only a middle portion of the surrounding area 16, i.e. the sub-area 17 is smaller than the surrounding area 16. In FIG. 4, various directions of movements into, out of and through the sub-area 17 are illustrated as arrows 30 to 40. The movements 30 and 31 result when an individual or a passerby walks past the vehicle 10. Such a movement does not normally lead to a locking or unlocking of the vehicle 10 or to an opening or closing of the sliding door 12, but instead is usually ignored. The arrows 32 and 33 represent a movement of, for example, the foot of a vehicle user 10, wherein the foot is first moved in the direction of the arrow 32 into the sub-area 17 and then in the direction of the arrow 33 back out of the sub-area 17. Such a back and forth movement is also called a kick gesture. Assuming that the vehicle side which, for example, was shown in FIG. 1, runs parallel in the direction of the arrows 30 or 31 and a user approaches the vehicle 10 from the side, i.e. the user has approached the vehicle 10 in a direction that is perpendicular to the arrows 30 and 31, the movement of the kick gesture of the arrows 32 and 33 runs approximately at an angle of 90 degrees to the direction from which the user has approached the vehicle 10. The arrows 34 and 35 show a corresponding kick gesture at an angle of 45 degrees from the right side into or out of the sub-area 17. The arrows 36 and 37 describe a kick gesture at an angle of 0 degrees, i.e. in the same direction in which the user has approached the vehicle 10. The arrows 38 and 39 accordingly describe a kick gesture at an angle of 45 degrees from the left side, and the arrows 40 and 41 a kick gesture at an angle of 90 degrees from the left. The kick gestures can be used, for example, to lock or unlock, open or close, one of the vehicle doors 11, 12. Furthermore, the kick gesture at an angle of 90 degrees from the right (arrows 32 and 33) can, for example, cause the sliding door 12 to be automatically opened, and the kick gesture at an angle of 90 degrees from the left can cause the sliding door 12 to be automatically closed.

Figure 5:
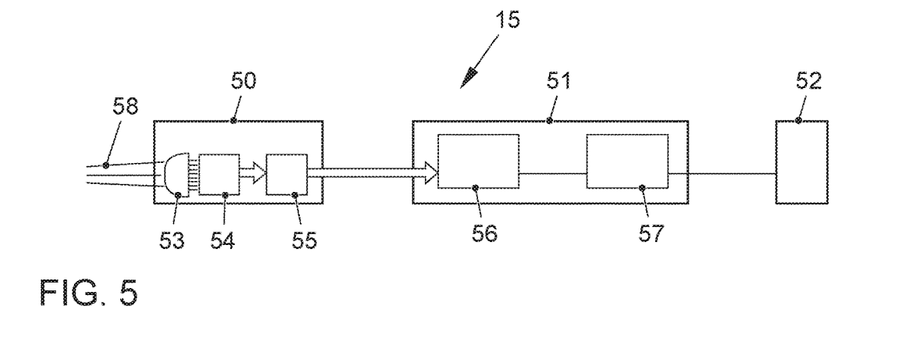
FIG. 5 shows a schematic view of a vehicle access system according to an embodiment of the present invention.

In reference to FIG. 5, the structure of the access system 15 is explained below in more detail. The structure of the access system 15 described below is a mere example, and comparable arrangements are also possible. Especially the physical arrangement of components of the access system 15 can be changed. Parts of the access system such as e.g. the processing apparatus 51 described below can be mounted in a different location on the vehicle 10 and be combined with other operating devices. The access system 15 comprises an optical sensing mechanism 50 and a processing apparatus 51. In order to detect optical information in a specific area surrounding the vehicle, the optical sensing mechanism 50 comprises an optical system 53, for example a lens or a lens system, and an optical sensor, for example a sensor matrix 54. The sensor matrix 54 can, for example, comprise several discrete or integrated sensors. Signals of the sensor matrix 54 are, for example, converted by a transducer device, an analog-to-digital transducer 55, to digital signals and transmitted to the processing apparatus 51. This way, the optical sensing mechanism 50 is able to convert light 58 which falls from a particular surrounding area onto the optical sensing mechanism 50 to the corresponding, digital signals. The light 58 can specifically be infrared light. Furthermore, the optical sensing mechanism 50 can include an illuminating device, for example, an infrared illuminating device or an infrared laser, wherein the surrounding area is illuminated. The processing apparatus 51 comprises, for example, a microprocessor control which performs a gesture recognition algorithm 56 and includes an interface 57 to a vehicle control 52. The vehicle control 52 can include a part of a vehicle locking system 10 as well as actuators for opening and closing of vehicle doors or hatches. Based on the results of the gesture recognition algorithm 56, corresponding operating information for locking or unlocking the vehicle 10, as well as for opening or closing the vehicle openings of the vehicle 10, are emitted via the interface 57 to the vehicle control 52.

Figure 6:
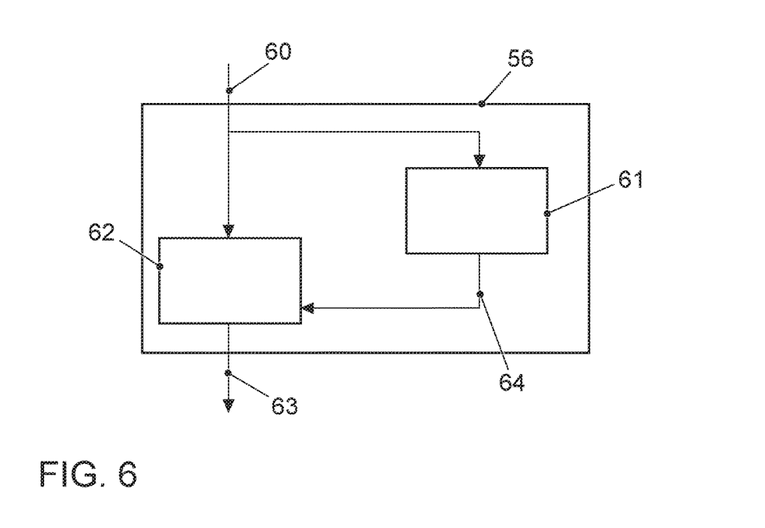
FIG. 6 shows a schematic view of a processing apparatus of a vehicle access system according to an embodiment of the present invention.

FIG. 6 schematically shows the gesture recognition algorithm 56 which is performed by the processing apparatus 51. Inputs 60 from the optical sensing mechanism 50 are routed to an approach detection 61 as well as a gesture recognition 62. The input 60 from the optical sensing mechanism represents raw data, i.e. essentially brightness values or color values from the optical sensors 54 of the optical sensing mechanism 50. Via a release 64, the gesture recognition 62 is activated or deactivated by the approach detection 61. Only when the approach detection 61 has recorded an approach in the coverage area 16 is the gesture recognition 62 activated via the release 64, and the input 60 from the optical sensing mechanism 50 is processed to provide an output 63 which can be emitted via the interface 57 to the vehicle control 52. In other words, with the method which is performed by the processing apparatus 51 monitors, a specific surrounding area or visual range is monitored for the presence of individuals. As soon as the presence detection discovers an object in the visual range, the gesture recognition 62 is activated. Until then, merely a small amount of computing power with low energy consumption is required. As soon as the gesture recognition 62 is activated, gestures can be detected, wherein however, full computing power is required and energy consumption can increase. As soon as the approach detection 61 no longer detects an object in the visual range, the gesture recognition 62 is again turned off. If the object or individual does not move, the object or individual is classified as part of the background after a short delay of approximately several seconds, and the gesture recognition 62 is again switched off. This is useful if, for example, another vehicle is parked next to the vehicle. Such an additional vehicle or other object is first classified as an object to be detected, but after being parked for a predefined period of time, it is classified as part of the background even though it still remains in the visual range.

Figure 7:
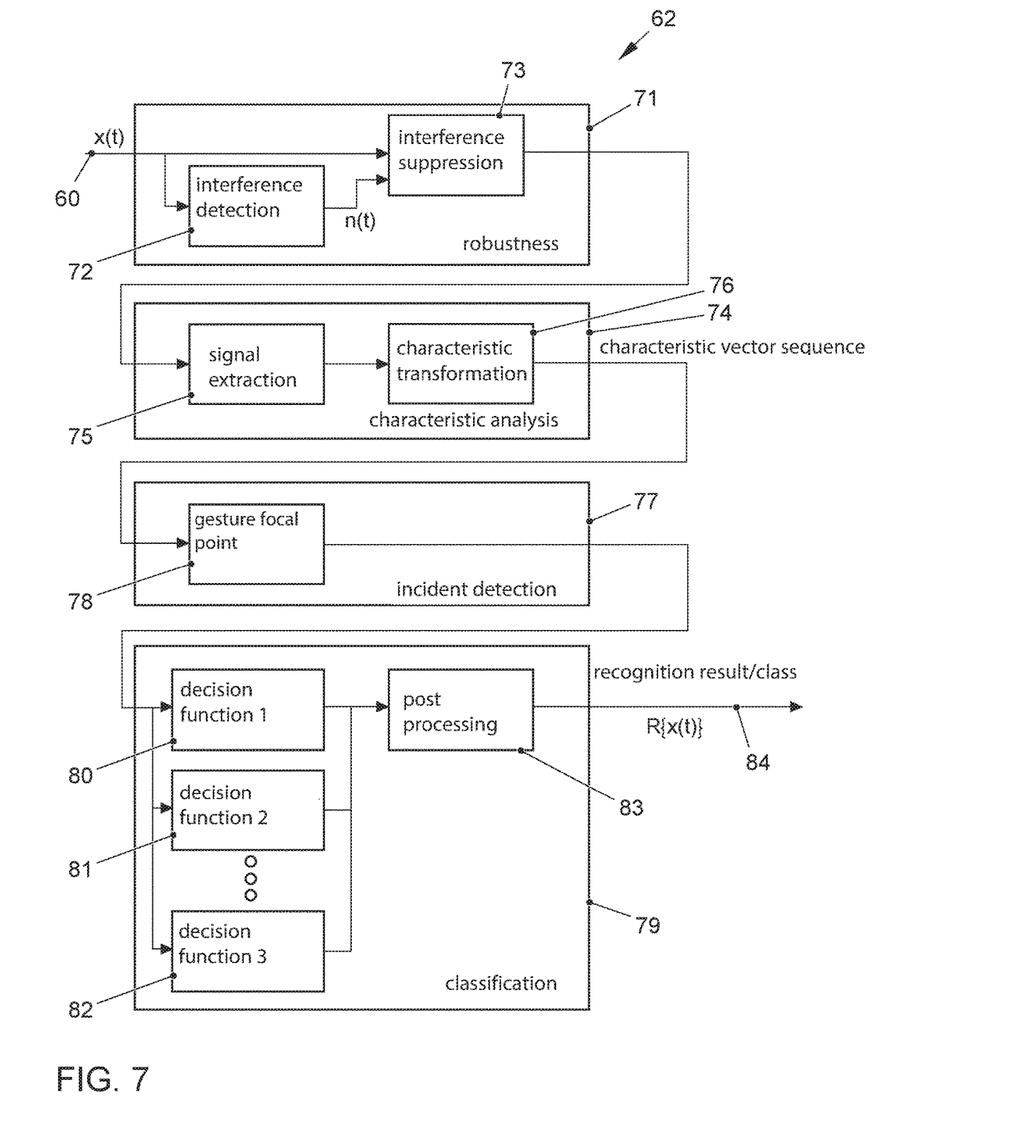
FIG. 7 shows process steps for a vehicle access system according to an embodiment of the present invention.

FIG. 7 shows the gesture recognition 62 in detail. The input 60 is first examined for interferences in step 72 and these interferences in step 73 are suppressed or filtered out. This way, the robustness of the method is increased in block 71. In block 74, characteristics of movements such as the ones described in connection with FIG. 4 are analyzed. For this purpose, motion signals can be extracted in step 75 and in step 76, and the characteristic can be transformed so that the motion characteristics are output as a vector sequence in block 74. In block 77, incident detection takes place by, for example, performing a gesture focal point trajectory in step 78. This can be useful, for example, if several motion events take place in the surrounding area. In block 79, classification of the detected gesture trajectories takes place. For example, a predefined group of possible gestures can be provided, and for each of these predefined gestures the probability of the respective gesture being present is identified with the corresponding decision functions 80 to 82. In a post processing step 83, these probabilities are analyzed and a recognition result 84 is emitted as the most probable gesture. During post processing 83 it is also possible that depending on the current vehicle status 10, some gestures are not meaningful and are therefore excluded. The post processing 83 can also not emit a gesture as recognition result 84 if neither of the decision functions 80 to 82 deliver sufficient probability for any one of the gestures.

The mode of operation of the access system 15 is described in more detail according to the following example. After detecting an approach, the gesture recognition 62 is in active status. In the active status, for example, four gestures are defined, which are:

"Gesture left handle": movement of the hand towards the left door handle 13. Upon recognizing this gesture, the door handle 13 of the left door 11 is automatically activated without the user touching it.

"Gesture right handle": movement of the hand towards the right door handle 14. Upon recognizing this gesture, the vehicle automatically activates the door handle 14 of the sliding door 12 without the user touching it.

"Gesture swipe left-right": hand movement from left to right which indicates the opening of the sliding door 12. Upon recognizing this gesture, the vehicle automatically opens the closed sliding door 12 without the user touching it.

"Gesture swipe right-left": hand movement from right to left which indicates the closing of the door 12. Upon recognizing this gesture, the vehicle automatically closes the sliding door 12 without the user touching it.

The gestures are only detected in the visual range 16, particularly in sub-area 17 within the visual range 16. This way, the gestures are detected, for example, at door handle height at a distance of, for example, 20 to 25 centimeters. In regards to the height, the swipe gestures should take place between door handle height and sensor height. All other movements outside the visual range are not detected.

In addition, the current status of the vehicle 10 can be considered during gesture recognition. Since mechanical signal recognition methods do not operate one hundred percent exact, the functionality must allow for error recognition. In order to minimize the number of error recognitions, context information can be used. In respect of gesture recognition, this would include the status of the sliding door and the presence of, for example, a keyless entry system transponder. This way, different gestures can be released or suspended. For example, the entire gesture control and gesture recognition can be deactivated if no key was detected in the area surrounding the vehicle. When the optical sensing mechanism 50 detects the presence of an individual and a valid vehicle key is detected in the area surrounding the vehicle 10, the gesture recognition 62 can be activated. If the sliding door 12 is in the closed end position, the gestures for opening the driver door 11 and the sliding door 12 are active, whereas the "gesture swipe right-left" for closing the sliding door 12 is deactivated. When the sliding door is opened in the end position, the "gesture swipe left-right" is deactivated. When the sliding door 12 is currently closing and is thus situated between the end positions, the "gesture swipe right-left" is deactivated and the "gesture swipe left-right" stops the closing motion of the sliding door 12. When the sliding door opens again and is situated between the end positions, the "gesture swipe left-right" is deactivated and the "gesture swipe right-left" stops the closing motion of the sliding door 12. If the sliding door 12 was stopped between the end positions and is currently at a standstill between the end positions, both swipe gestures are active and trigger movement of the sliding door 12 in the respective direction.

In summary, gesture detection via a contactless optical sensor has been attained. To achieve high recognition accuracy, the input signals can be pre-processed, specifically filtered and enhanced, in order to take into account changing ambient conditions. The expected gestures are predefined and can, for example, be described in a configuration file. The gesture is detected via classification of decision functions which utilize information from the configuration file. The method differentiates between approach detection which examines whether an individual or an object is located within the visual field of the sensor, and gesture recognition so that power consumption levels of the access system can be decreased. Gesture recognition only occurs after a positive object approach detection. The approach detection can utilize a lower resolution than the gesture recognition so that this way, power consumption levels can also be decreased. Finally, several sensors can be arranged at different locations on the vehicle, for example at the B-pillar as shown in FIG. 1, and in the vehicle hatchback area 10. If an individual passing by the doors 11 and 12 is detected, a corresponding sensor at the vehicle rear area can be activated for gesture recognition.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A microprocessor-implemented method for an access system for a vehicle, the method comprising:
   detecting and recording a first optical information in a specific area surrounding the vehicle;
   identifying an object approaching the vehicle as a function of the recorded first optical information;
   detecting and recording a second optical information in the surrounding area as a function of the identification of the object approaching;
   identifying gesture information of the object as a function of the recorded second optical information; and
   activating a locking mechanism or a door opening mechanism of the access system as a function of gesture information,
   wherein the first optical information is recorded with a first resolution and the second optical information is recorded with a second resolution, wherein the second resolution is higher than the first resolution.

2. The microprocessor-implemented method according to claim 1, wherein the identification of the object approaching the vehicle comprises:
   identifying object movement in the surrounding area; and
   identifying an object remaining in the surrounding area.

3. The microprocessor-implemented method according to claim 2, wherein the method further comprises:
   terminating the detection of the second optical information when the object remains in the surrounding area longer than a predefined period of time.

4. The microprocessor-implemented method according to claim 1, wherein the method further comprises:
   activating a transponder radio system of the access system as a function of the identification of the object approach.

5. The microprocessor-implemented method according to claim 1, wherein the object is an individual and gesture information is identified as a function of a motion pattern of a body part of an individual, and wherein the motion pattern comprises at least one of:
   movement of a body part in the direction of a vehicle door handle;
   movement of a body part in the opening direction of a vehicle sliding door;
   movement of a body part in the closing direction of a vehicle sliding door; and/or
   back and forth movement of a body part, wherein while moving forward, the body part moves into a particular sub-area of the surrounding area and when moving back, the body part again leaves the particular sub-area of the surrounding area.

6. The microprocessor-implemented method according to claim 1, wherein the method further comprises:
   illuminating the surrounding area with infrared light, wherein the first optical information and/or the second optical information are recorded in an infrared light area.

7. The microprocessor-implemented method according to claim 6, wherein the surrounding area is illuminated with infrared light impulses.

8. The microprocessor-implemented method according to claim 1, wherein the method further comprises:
   providing a predefined quantity of gestures;
   identifying probability information for each gesture of the quantity of gestures as a function of the second optical information; and
   triggering the access system as a function of probability information.

9. A microprocessor-implemented method for an access system for a vehicle, the method comprising:
   detecting and recording a first optical information in a specific area surrounding the vehicle;
   identifying an object approaching the vehicle as a function of the recorded first optical information;
   detecting and recording a second optical information in the surrounding area as a function of the identification of the object approaching;
   identifying gesture information of the object as a function of the recorded second optical information; and
   activating a locking mechanism or a door opening mechanism of the access system as a function of gesture information,
   the method further comprising:
   providing a predefined quantity of gestures;
   identifying probability information for each gesture of the quantity of gestures as a function of the second optical information; and
   triggering the access system as a function of probability information,
   wherein the provision of the predefined quantity of gestures comprises:
   providing a current status of the access system and/or the vehicle; and
   providing a subset of a predefined quantity of gestures as a function of the current status.

10. An access system for a vehicle comprising:
   an optical sensor recording first and second optical information in a specific area surrounding the vehicle; and
   a microprocessor coupled with the optical sensor, the microprocessor receives the recorded first optical information via the optical sensor to detect an object approaching the vehicle as a function of the first optical information, receives the recorded second optical information in the surrounding area via the optical sensor as a function of the detection of the approaching object, and identifies gesture information of the object as a function of the second optical information,
wherein the recorded first optical information has a first resolution and the recorded second optical information has a second resolution, wherein the second resolution is higher than the first resolution.

11. The access system according to claim 10, wherein the access system performs the method comprising:
   detecting a first optical information in a specific area surrounding the vehicle;
   identifying an object approaching the vehicle as a function of the recorded first optical information;
   detecting the second optical information in the surrounding area as a function of the identification of the object approaching;
   identifying gesture information of the object as a function of the second optical information; and
   activating a locking mechanism or a door opening mechanism of the access system as a function of gesture information.

12. A vehicle with an access system according to claim 10.

13. The access system according to claim 10, further comprising an infrared light that illuminates the specific area surrounding the vehicle with infrared light impulses, wherein the first optical information and the second optical information are recorded in the specific area surrounding the vehicle that is illuminated with the infrared light impulses.

* * * * *